J. C. THOEN.
VEHICLE WHEEL.
APPLICATION FILED JAN. 16, 1911.
1,004,501.
Patented Sept. 26, 1911.
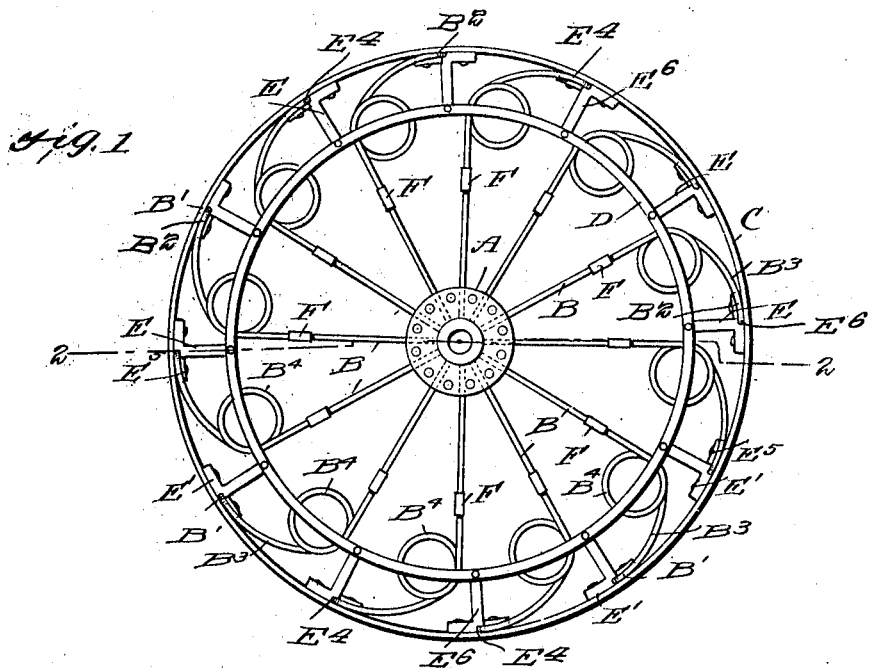
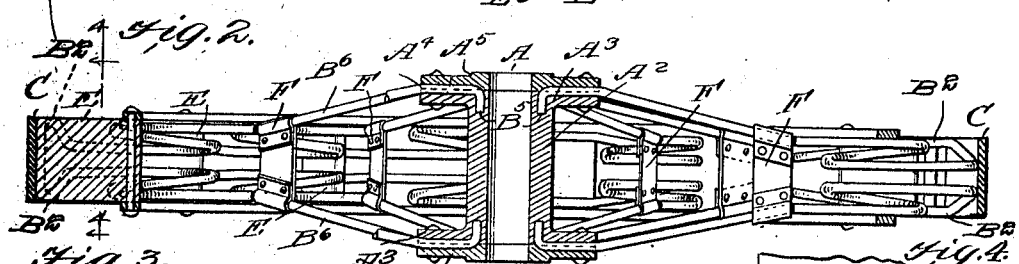
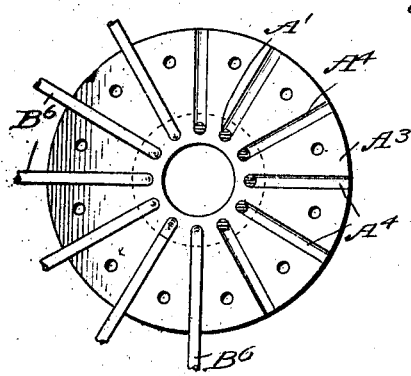
WITNESSES:
F. C. Barry
Perry B. Turpin
INVENTOR
JOHN C. THOEN
BY 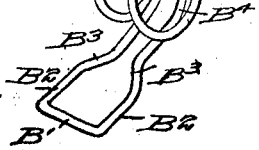
ATTORNEYS

UNITED STATES PATENT OFFICE.

JOHN C. THOEN, OF BURKE, IDAHO.

VEHICLE-WHEEL.

1,004,501.     Specification of Letters Patent.    Patented Sept. 26, 1911.

Application filed January 16, 1911. Serial No. 602,900.

*To all whom it may concern:*

Be it known that I, JOHN C. THOEN, a citizen of the United States, and a resident of Burke, in the county of Shoshone and State of Idaho, have invented certain new and useful Improvements in Vehicle-Wheels, of which the following is a specification.

This invention is an improvement in spring wheels and has for an object to provide a novel construction of wheel which will have sufficient resilience to permit its practical operation on automobiles and the like without pneumatic tires, and the invention consists in certain novel constructions and combinations of parts as will be hereinafter described and claimed.

In the drawing Figure 1 is a side view of a wheel embodying my invention. Fig. 2 is a cross section on about line 2—2 of Fig. 1. Fig. 3 is an elevation of the inner side of one of the flanges of the hub, some of the spokes being shown in part. Fig. 4 is a section on about line 4—4 of Fig. 2. Fig. 5 is a detail perspective view of one of the spokes.

The wheel, as shown, comprises the hub A, the spokes B, the rim C, the guide rings D, the brackets E and the bridles F all of which will be more fully described hereinafter.

The spokes B are formed of rods of spring metal bent between their ends forming the cross bars B' which are held by the brackets E to the rim C and also forming the side bars B² which are deflected inwardly at B³, are separately coiled at B⁴, are connected adjacent to the coils B by the bridles F and have their inner ends spread apart and provided at their inner extremities with inwardly projecting studs B⁵ which enter sockets A' in the body A² of the hub A. This body A² of the hub has end flanges A³ grooved radially at A⁴ leading from the sockets A' and the spokes B are held to the flanges A³ by the end plates A⁵ riveted or otherwise secured to the flanges A³ and securing the spokes firmly in connection with the hub, as best shown in Fig. 2 of the drawing.

The bridles F are bent at their ends around the side sections B² of their respective spokes at the inner side of and near the coils B⁴, the bridles F being secured to the outwardly flaring portions B⁶ of the spokes near the juncture thereof with the parallel portions B⁷ which immediately connect with the coils B⁴. These bridles F operate to steady the side sections of the spokes one from the other and secure a joint movement of the sections in the practical operation of the invention.

The coils B⁴ give greater resiliency to the spokes and thus improve the action of the wheel.

The brackets E have their head plates E' riveted at E² and E³ to the rim and these head plates are provided in their outer sides with grooves E⁴ receiving the cross bars B' of the spokes so the said cross bars are held between the head plates of the brackets and the rim C, the ends E⁵ of the brackets being narrowed as best shown in Fig. 4, so the side bars of the spokes may pass alongside the narrowed portion E⁵ and lie within the planes of the side edges of the bracket head plate, as best shown in Fig. 4.

The brackets E have the inwardly projecting arms E⁶ which support the guide rings D at their inner ends, said guide rings extending on opposite sides of the spokes and preferably along the coiled portions of said spokes and bracing the said spokes against lateral displacement.

I claim:

1. The spring wheel herein described, comprising a hub, a rim, brackets having head plates secured to the inner side of the rim and having in their outer faces transverse grooves and having narrowed end portions extending beyond said grooves, the said brackets being provided with inwardly projecting arms, spokes secured at their inner ends to the hub and consisting of spring rods bent between their ends forming cross bars at their outer ends and held within the grooves of the head plates, and side sections extending alongside the narrowed portions of their respective head plates, the said side sections being coiled, bridles connecting the opposite side sections of their respective spokes and guide rings secured to the inner ends of the bracket arms and extending alongside the spokes, substantially as set forth.

2. The combination with a rim and a hub, of head plates held against the inner side of the rim and provided in their outer sides with transverse grooves and with narrowed portions extending therefrom and spokes secured at their inner ends to the hub and having at their outer ends cross bars secured in the transverse grooves of the head plates and extending thence alongside the narrowed portions of their respective head plates, whereby the portions of the spokes on opposite sides of said narrow portion of the head plates will be braced by the latter as against lateral movement immediately adjacent to the transverse grooves of their respective head plates, substantially as set forth.

3. A spring wheel comprising a rim, a hub, spring spokes between the rim and hub and comprising side sections spaced apart said side sections having near their inner ends inwardly inclined portions and provided with coiled portions and parallel portions between said coiled portions and the inclined portions and bridles extending between and secured to the inclined portions of the opposite side sections of their respective spokes adjacent to the parallel portions of said spokes, substantially as set forth.

4. A spring wheel comprising a rim, a hub, spring spokes extending outwardly from the hub and having at their outer ends portions deflected in the circumferential direction of the rim of the wheel, the spokes being coiled at the said deflected portions of the body of the spokes, means securing the outer ends of the spokes and bracing rings extending along the opposite sides of the spokes and across the coiled portions thereof, substantially as set forth.

JOHN C. THOEN.

Witnesses:
 SOLON C. KEMON,
 PERRY B. TURPIN.